April 14, 1936.  W. D. MOORE  2,037,084
LEAK CLAMP FOR PIPE JOINTS
Filed Aug. 1, 1934   2 Sheets-Sheet 2
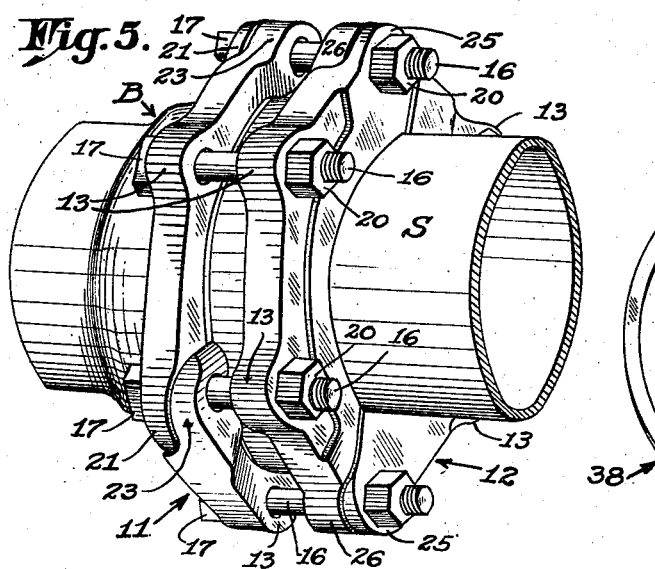
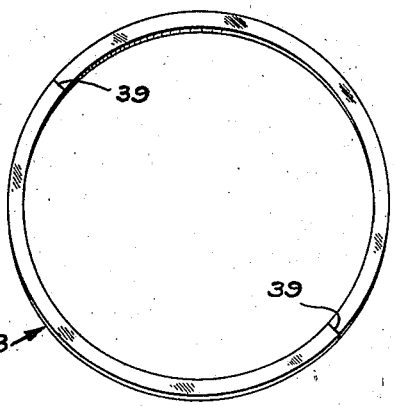
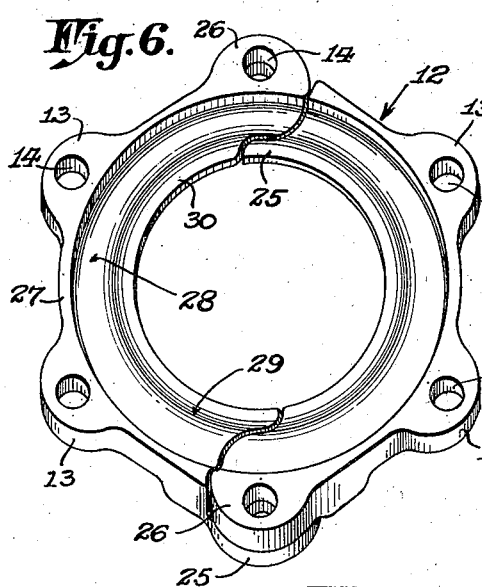
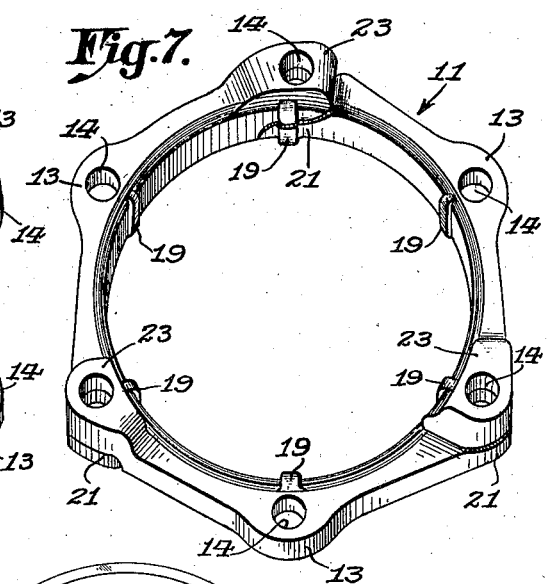
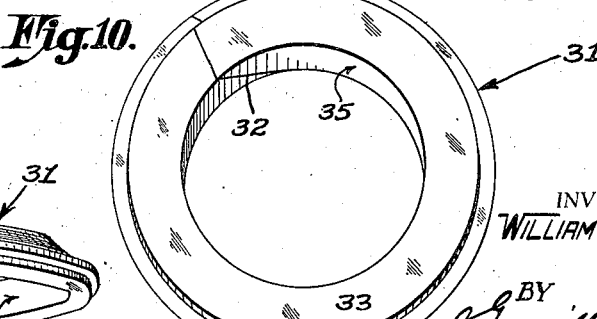
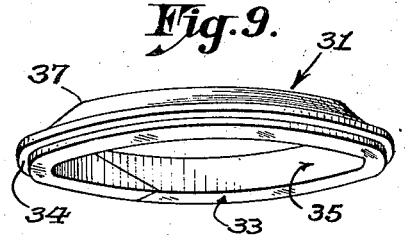
INVENTOR
WILLIAM D. MOORE
BY
ATTORNEY.

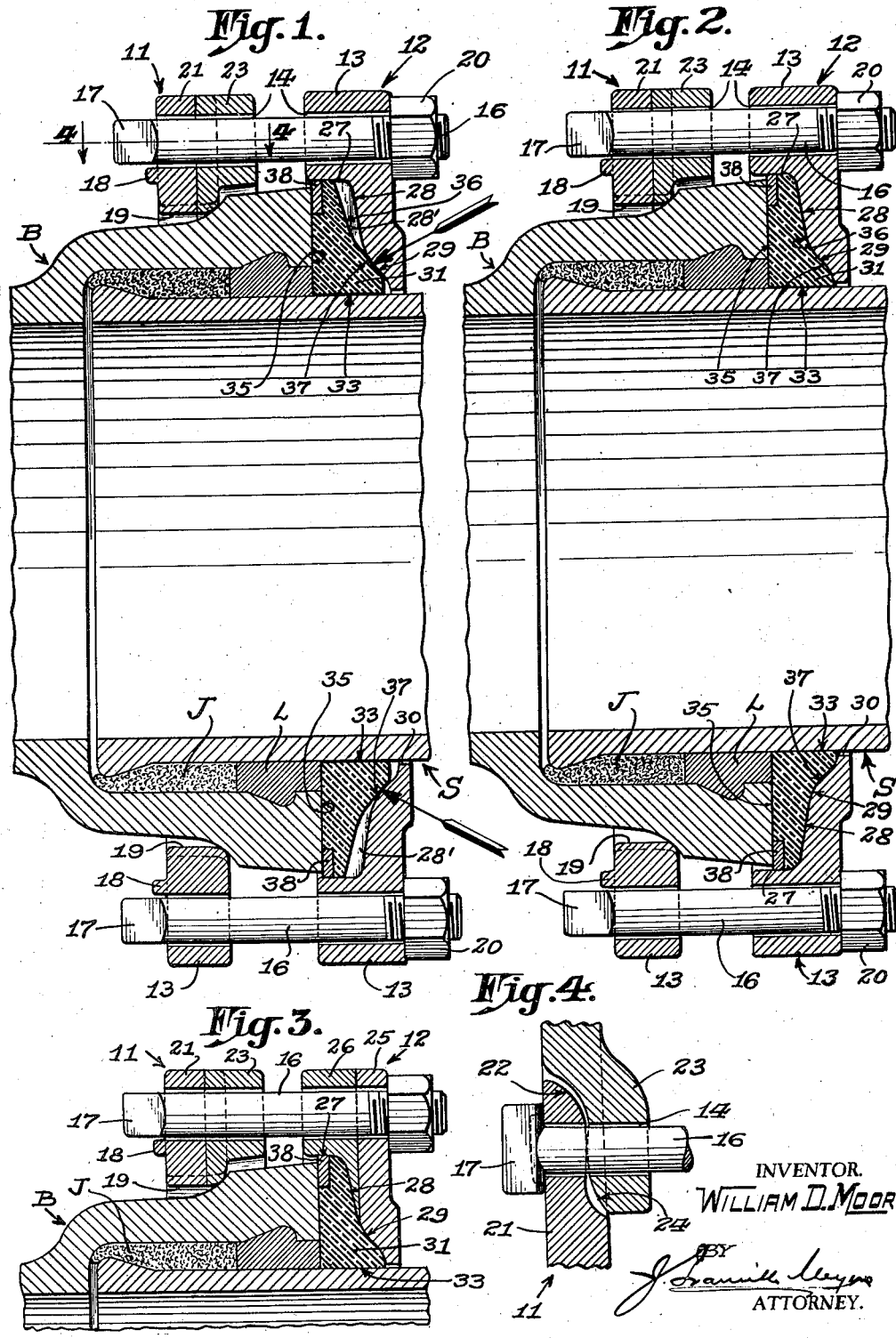

Patented Apr. 14, 1936

2,037,084

UNITED STATES PATENT OFFICE 2,037,084

LEAK CLAMP FOR PIPE JOINTS

William D. Moore, Birmingham, Ala., assignor to American Cast Iron Pipe Company, Birmingham, Ala., a corporation of Georgia Application August 1, 1934, Serial No. 737,979

5 Claims. (Cl. 285—119)

The present invention relates to certain new and useful improvements in repair clamps, sometimes referred to as "leak clamps", for use in sealing leaky joint packings in installed bell and spigot pipe lines.

It is well understood in the art that the joints of bell and spigot pipe lines are generally caulked with jute, lead and other packing materials when the lines are originally installed, and that such pipe lines are usually laid underground where the joints are inaccessible except after excavating to remove the covering material or earth. It is also well known that such joints, or some of them, sooner or later develop leaks that are caused either by a settling consequent upon movement of the pipe line, and when such leaks occur they must be quickly repaired or sealed in order to prevent a wastage of the fluids passing through the pipe line or damage resulting from the leakage.

The principal objects of the present invention, among others, are to provide a repair or leak clamp for bell and spigot pipe joints, that is simple in construction, cheap to manufacture, easy to apply, and which when applied allows for movements of the pipe joint; and wherein the repair gasket will be entirely enclosed and therefore protected from the deteriorating influences of the constituents of the soil in which the pipe line is laid, thus materially increasing the effective life of the repaired joint.

In the drawings,

Fig. 1 is a longitudinal sectional view through a pipe joint and clamping elements embodying my invention showing the relative position of the elements before tightening;

Fig. 2 is a view similar to Fig. 1 showing the relative position of the elements after they have been tightened;

Fig. 3 is a sectional view through a fragment of the pipe joint and parts of the clamping elements showing the splice in the spigot ring;

Fig. 4 is a sectional view taken on the line 4—4 of Fig. 1;

Fig. 5 is a perspective view of fragments of the pipe sections with the clamping elements applied thereto;

Fig. 6 is a perspective view of the spigot ring of Fig. 5;

Fig. 7 is a perspective view of the bell ring;

Fig. 8 is a perspective view of a sealing ring; and

Figs. 9 and 10 are perspective views of the gasket.

In the drawings, the letter B designates generally the bell section, and S the spigot section of pipes which have telescoping fit to form the bell and spigot joint with the usual jute packing J and lead packing L between the pipe sections, and with the lead packing terminating substantially flush with the end of the bell section. The numeral 11 designates generally the bell ring which, in the present instance, is shown formed of three sections or segments, and 12 designates generally the spigot ring shown formed of two sections or segments. I wish it to be understood however, that the bell ring may be formed of any number of sections or segments, and that the same is true of the spigot section. For instance, the bell section may be formed of two, three or more sections as may also the spigot section. Both of the rings 11 and 12 have peripheral projections 13 provided with holes 14 to receive the bolts 16 which have elongated heads 17. The ring against which the head 17 abuts is preferably formed with lugs 18 for engagement by the heads of the bolts to prevent the bolts from rotating when the nuts 19 are turned on the threaded ends of the bolts. The bell section is also provided with longitudinal narrow pad bearings or ribs 19 to engage the bell end of the pipe B to provide for variation in the bell sizes, that is, to allow the ring to adjust itself to any irregularities in the bell pipe surface without undue strain when the nuts are tightened on the bolts.

To afford flexibility to the bell ring and to provide for its adjusting itself in the event that the pipe settles after the clamping elements are assembled and tightened, I provide as shown clearly in Fig. 4, that the splices or joints where the segments are secured together are in the nature of ball joints. It will be noted that the segment 21 of the ring 11, in Fig. 4, is shown provided on the inner face of its end with a convex surface 22, and that the end of the segment 23 is provided with a similar surface 24 confronting the surface 22. The hole 14 extends through the confronting convex surfaces, so that when the nuts are tightened on the bolts, the segments are drawn tightly together and yet are afforded predetermined relative movement.

The segments of the spigot ring 12 also have overlapping ends 25 and 26 and each segment has an annular flange 27 extending beyond an inclined wall 28, at the lower end of which is formed a convex surface 29. This annular flange and the gasket engaging wall, of which the convex bulge 29 forms a part, provides an annular recess 28', to receive the gasket 31, the inner portion of which is open for a purpose presently to be described. The lower edge 30 of the ring 12 is of substantially the same diameter as the outer diameter of the spigot section S. The inner surfaces of the spigot ring contact the gasket shown in perspective in Figs. 9 and 10. This gasket, designated generally by the numeral 31, is preferably made of compressible material such as high quality rubber molded to size and furnished with a long diagonal splice cut 32. The gasket has an unusually large cross sectional area, and its flat face or surface 33 almost completely covers the end of the bell section and the lead packing L. At the outer edge of the broad flat face 33 there is a circumferential groove 34. The inner flat face 35 surrounds the spigot section and the outer face of the gasket which confronts the inner face of the spigot ring 12 is formed with an inclined wall 36 terminating at the annular bulge 37 which extends all the way around the gasket in alinement with the convex surface 29 of the ring 12. The groove 34 receives a metallic sealing ring 38, and as shown in Figs. 1–3, the sealing ring 38 and outer end of the gasket preferably extend slightly beyond the end of the bell section and are disposed beneath the wall 27 of the ring 12. The sealing ring 38 is split in two places designated by the numeral 39 in Fig. 8 to facilitate assembly around the groove 34. When the ring 38 is seated in groove 34 the entire surface of the bell end is covered by the gasket and ring.

In assembling the parts on the pipe joint, the segments of the ring 11 may be first assembled around the bell section, and the bolts 16 inserted through the holes 14 in the segments of the section 11. The gasket 31 is then opened along the splice 32 and is placed around the spigot section with the relatively broad flat face 33 in engagement with the end of the lead packing and the end of the bell. The sections of the sealing ring 38 are then inserted in groove 34. The segments of the spigot ring 12 are then assembled around the spigot section S with the ends of the bolts extending through the holes 14 in the ring 12. The nuts 20 are then applied to the threaded ends of the bolts to hold the parts in assembled relation, as shown in Fig. 11, at which time there is a space between the wall 36 of the gasket and the wall 28 of the ring 12 while the convex surface 29 on the ring 12 is contacting the projecting surface 37 on the gasket. The inner end 30 of the ring is also spaced from the lower end of the gasket. It will also be noted that the sealing ring 38 is in engagement with the flange 27 of the ring 12 enclosing the upper end of the gasket within the ring 12. The sealing ring 38 not only encloses or houses the gasket within the ring 12, but also securely and permanently maintains high compression of the gasket when the bolts are tightened as presently explained.

In Fig. 1 the arrows indicate the direction of the initial pressure brought to bear on the gasket when the nuts are tightened, forcing the inner lower corner of the gasket tightly against the lead packing of the caulked joint and the outside of the pipe of the spigot section which enters the caulked joint. The construction and arrangement of the parts is such that the joint is tightly sealed at these critical points before the general pressure on the entire surface of the gasket is brought to bear, and this is due to the fact that the ring 12 and gasket have the projecting contacting surfaces which are forced together before the gasket is deformed to assume the shape of the inner face of the ring 12.

During the final stages of the tightening of the nuts 20 on the bolts 16, the spigot ring 12 is drawn very tightly into engagement with the gasket, and as shown in Fig. 2 the projection 37 on the gasket is displaced by the concave face 29 of the spigot ring. The space between the faces 36 of the gasket and 28 of the ring is closed as the ring bears in toward and against the gasket, with flange 27 telescoping over the bell end, but the material of which the gasket is formed is prevented from being forced out between the bell end of the pipe B and the wall 27 of the spigot ring by the sealing ring 38. Thus the sealing ring cooperates with the spigot ring to securely and permanently maintain high compression of the gasket when the bolts and nuts are tightened. The lower outer end of the gasket is also brought tightly into contact with the part 30 of the ring, so that when the nuts have been completely tightened the gasket is substantially housed within the spigot ring between the lead packing L, the end of the spigot section B, sealing ring 38, and spigot section S of the pipe where it is protected from the natural elements present in the ground which might adversely affect the gasket. The gasket is tightly and permanently maintained against the spigot section of the joint, and the lead packing and the bell end of the pipe which are contacted by the relatively broad flat surfaces 33 and 35, and the point at which these surfaces meet, namely, the inner corner of the gasket is firmly and permanently held against the joint between the lead packing and the spigot section tightly sealing the same.

As previously mentioned, due to the formation of the ball joints between the segments of the bell ring 11, if the pipe settles or moves, the ring 11 will adjust itself without releasing the pressure maintained on the gasket, due to the flexibility provided by the ball joints connecting the segments.

From the foregoing it should be obvious that a leak clamp for pipe joints made in accordance with my invention possesses several advantages including maximum life against corrosion, as all exposed parts are preferably made of heavy cast iron construction, and the gasket is completely sealed or housed within the cast iron parts. Furthermore, the large cross sectional rubber gasket covering practically the entire end wall thickness of the bell is prevented from extruding or flowing by the sealing ring and any reasonable pressure can be applied to the gasket by means of the bolts. Due to the fact that the gasket cannot flow or extrude, when the bolts are initially tightened, pressure is immediately applied in the direction of the lead packing and spigot pipe tightly sealing the joint.

Furthermore, due to the simplicity in design and construction, the parts may be easily made and applied to pipe joints, and for the reasons above pointed out, and further due to the fact that the installation provides for movement of the joints, there is no maintenance required after installation.

I claim:

1. A leak clamp for pipe joints comprising a sectional bell ring constructed to surround and engage the bell portion of a pipe, a sectional spigot ring constructed to surround the spigot portion of a pipe, an annular gasket of compressible material having a relatively broad and flat face of sufficient width to substantially cover the bell end wall of a pipe and an opposed irregular face having a thickened annular portion around its inner edge, said spigot ring having an annular outwardly flaring gasket engaging face of irregular formation and of a width substantially corresponding to that of the irregular face of the gasket, and means for connecting the bell and spigot rings operating to compress the gasket against the bell end of a pipe to which the clamp has been applied with the maximum of compression directed radially inward toward the joint packing of a telescoping bell and spigot pipe by confronting projections on the gasket and spigot ring, said spigot ring having an integral annular flange telescopingly fitting over the end of the bell portion of a pipe and forming a confining wall for the outer edge of the gasket.

2. A leak clamp of the character described, including a sectional ring having an annular gasket receiving recess formed with a relatively broad convex face, said recess bounded by an annular flange adapted to closely telescope over the bell end of a pipe and provide a confining wall for the outer edge of a gasket located in said recess.

3. A leak clamp of the character described, including a sectional spigot ring having a relatively broad outwardly flaring gasket engaging face formed with an annular convex portion near its inner edge and an annular outstanding lateral flange around its outer edge adapted to telescopingly receive the bell end of a pipe, said face and flange forming an annular gasket receiving recess, and a gasket of compressible material removably seated in said recess, said gasket having a broad flat outer face and an outwardly flaring inner face adapted to be contacted by the wall forming the base of the said recess.

4. A leak clamp of the character described, including a sectional spigot ring having a relatively broad gasket engaging face formed with an annular convex portion near its inner edge and an annular flange around its outer edge adapted to telescopingly receive the bell end of a pipe, said face and flange forming an annular gasket receiving recess, a gasket of compressible material removably seated in said recess, said gasket having an annular peripheral groove in one of its faces, and a split metal ring located in said groove, the outer edge of said ring facing the inner wall of the annular flange.

5. A leak clamp of the character described, including a sectional spigot ring and a sectional bell ring with a gasket therebetween, the sections of said rings having overlapping ends, means to hold said ends together and to draw the rings toward each other to compress the gasket, the overlapping ends of the bell ring being formed as ball joints.

WILLIAM D. MOORE.